Sept. 26, 1944.  E. E. LIBMAN  2,359,132
VARIABLE SPEED TRANSMISSION
Filed Nov. 2, 1942
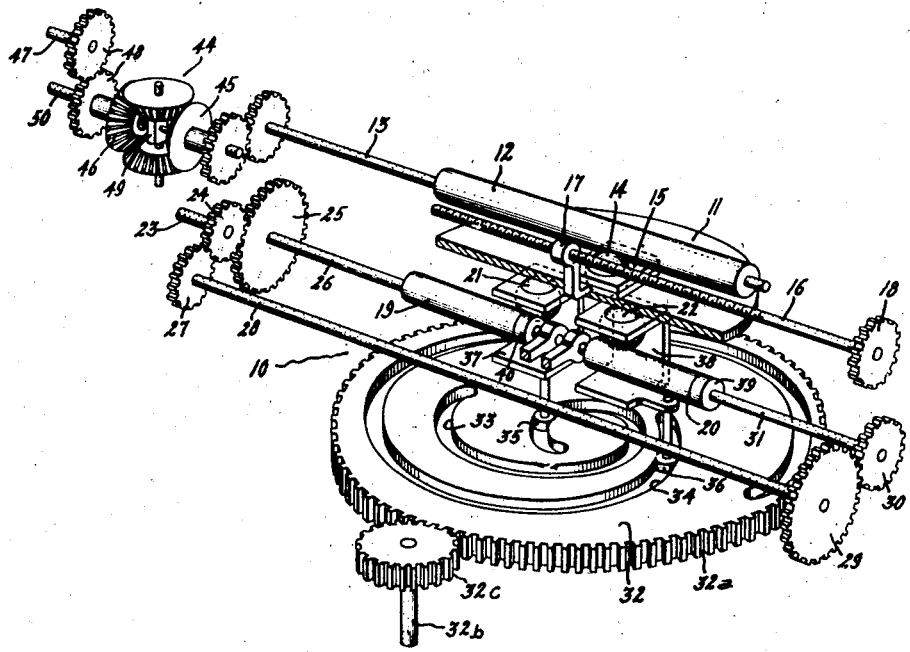
Inventor:
Earl E. Libman,
by Harry E. Dunham
His Attorney.

Patented Sept. 26, 1944

2,359,132

UNITED STATES PATENT OFFICE 2,359,132

VARIABLE SPEED TRANSMISSION

Earl E. Libman, Schenectady, N. Y., assignor to General Electric Company, a corporation of New York Application November 2, 1942, Serial No. 464,171

7 Claims. (Cl. 74—198)

This invention relates to a variable speed transmission, such as may be used in solving certain mathematical problems, and it has for its general object the provision of an improved device of this character.

More particularly, this invention contemplates the provision of a frictional variable speed transmission of the type employing a ball in rolling contact with a plurality of rotatable elements, one of which is a disk and the other a roller or similar device, the ball being shiftable radially with reference to the disk in order to vary the speed ratio between the rotatable elements; and it contemplates the provision of such transmission which will solve several mathematical problems at the same time, such as dividing one quantity by a second and integrating the quotient with respect to still another.

It further contemplates an improved transmission of the general type where a disk, and a roller or the like are connected in driving relation by a ball, and it contemplates an improved device of this character which is extremely positive and accurate in its operation. In devices of this general character heretofore known, the ball at times must operate at a point quite close to the center of the disk; this is particularly true where the position of the ball is controlled in accordance with a quantity which varies through a wide range. When the ball rotates close to the center there is a considerable loss in driving torque, and there is apt to be an undue amount of slippage between the ball and the driving and driven elements. This objection is obviated by the transmission of this invention.

In accordance with this invention, a rotatable disk element is connected in driving relation through a ball drive with a first roller which is the driven output element, and also through a second ball with a second roller, which is the input driving element. The position of the first ball is adjusted radially with reference to the disk in accordance with a predetermined quantity (a), and that of the second with reference to the disk in accordance with a predetermined quantity (b), while the driving roller is driven to introduce a third quantity (c). The parts are constructed and arranged so that the output of the driven roller is the integral of the quotient of $$\frac{a}{b}$$

with respect to (c).

Further the driving element is divided into two parts—one a high speed and the other a low speed drive—each part having its own driving roller and each driving roller being connected with the disk through its own separate ball. Neither of the balls is ever operated into the central position near the center of the disk, that is, it never is adjusted so close to the center that the driving torque is materially reduced or so that undue slippage occurs. The two parts alternately control the disk, one being idle while the other is driving. Thus, for example, the low speed part may drive the disk until its ball moves in radially to the inner end of its roller, and then the high speed part takes over, its ball then being moved radially inwardly from its extreme outer position so as to drive the disk just as would the low speed part if it had continued its control by moving its ball still further inwardly toward the center of the disk. In this way, the effect of a single driving element is obtained without its disadvantages—loss of driving torque and slippage.

For a more complete understanding of this invention reference should be had to the single figure in which there is a perspective view of a variable speed transmission embodying this invention, a part being shown in section so as to illustrate certain structural details.

Referring to the drawing, this invention has been shown as applied to a variable speed transmission 10 for solving the mathematical problems of dividing a first quantity by a second and at the same time integrating the quotient. A specific use for this device is obtaining the bearing B of a target from the known quantities; range of the target R; horizontal component of target's relative velocity perpendicular to the line of sight $$R\frac{dB}{dt}$$

and time $t$.

The transmission 10 comprises a flat disk 11 which is arranged to rotate on a fixed axis, which is vertical, as viewed in the figure. A roller 12 is spaced above the disk parallel to a diameter thereof, and it is arranged to rotate on an axis perpendicular to that of the disk 11, and also is arranged to drive a shaft 13.

A ball 14 is introduced between the top surface of the disk 11 and the roller 12 so as to engage them and effect a frictional driving connection between the disk and roller, the ball engaging the disk in a diameter thereof. The ball 14 is mounted in a cage 15 which is movable radially across the face of the disk so as to change the position of the ball and thereby change the speed ratio between the disk and the roller. The radial position of the ball is controlled by suitable means, such as an adjusting screw 16 which has a threaded connection 17 with the cage 15, and which may be driven by any suitable means, as by a spur gear 18 which is secured to the shaft, and with which meshes a driving spur gear of a suitable driving mechanism (not shown).

The disk 11 constitutes a driving member for the roller 12 which is the output of the transmission. The disk 11 in turn is driven by a suitable driving device comprising a pair of aligned rollers 19 and 20. These rollers are spaced below the bottom of the disk and are arranged to rotate on a horizontal axis, as viewed in the drawing, which is parallel to a diameter of the disk, and further, which is parallel to the axis of rotation of the roller 12. Interposed between the rollers 19 and 20 and the bottom surface of the disk are balls 21 and 22 which respectively effect driving connections between the rollers and the disk, and which engage the disk in a diameter thereof.

The rollers 19 and 20 are driven from an input control shaft 23 which carries a driving spur gear 24 that meshes with a spur gear 25 secured to the shaft 26 of the roller 19. The spur gear 24 also drives the second roller 20 through a spur gear 27, a shaft 28 driven thereby, a spur gear 29 driven by the shaft and a spur gear 30 mounted on the shaft 31 of the roller 20. The gearing between the drive shaft 23 and the two rollers 19 and 20 is such that the roller 19 is driven at a relatively low speed and the roller 21 at a relatively high speed; for example, the roller 19 may be driven at 200 R. P. M., while the roller 20 is driven at 600 R. P. M.

The radial positions of the two balls 21 and 22 with reference to the disk 11 are controlled by means of a cam 32 which rotates on an axis that is coincident with the axis of movement of the disk 11. The cam 32 is provided on its periphery with a spur gear 32a which is driven by a shaft 32b through a spur gear 32c. The cam 32 also is provided with a pair of cam slots 33 and 34 arranged generally in the shapes of spirals and in which cam followers 35 and 36 respectively travel. These two cam followers are connected respectively with the cages 37 and 38 of the two balls 20 and 21 respectively. The cam slots control the positions of the two balls so that only one can control the rotation of the disk 11 at a time; the right-hand high speed ball 22 is controlled to move in on the outer end of the roller 20 to take over the operation of the disk 11 only when the low speed ball 21 has been moved inwardly to its extreme inner radial position with reference to the center of the disk; and the low speed ball will again assume control only when the high speed ball has returned to its outer position. When the ball 21 is controlling the disk, the ball 22 rests on an idler bearing 39 which is freely rotatable upon the shaft 31 at the outer end of the roller 20, and at this time the ball merely drives the bearing as the ball is rotated by the disk. In a similar way, when the ball 22 is controlling the rotation of the disk, the ball 21 will rotate upon an idler bearing 40 which is freely rotatable upon a shaft 26 at the inner end of the roller 19. The major portion of the length of the outer cam slot 34 is in the form of a true circle with its center in the axis of the cam so that it holds the ball 22 on its bearing 39 while the cam slot 33 is advancing the ball 21 inwardly radially along the length of the roller 19. However, the cam slot 34 is so shaped that when the ball 21 is being shifted onto its bearing 40, the ball 22 will be shifted from its bearing 39 to take over the driving disk 11 in a smooth uninterrupted fashion. The inner cam slot 33 is so shaped that it will progressively move its ball 21 inwardly along the length of the roller 19 until it is moved onto the bearing 40 when the cam slot will assume the shape of a circle having its center in the axis of rotation of the disk to thereafter hold the ball 21 on the bearing while the ball 22 is controlling the motion of the disk.

This high-low speed arrangement of the drive for the disk 11 obviates the necessity of operating a ball close to the central axis of the disk, and therefore obviates loss of torque and prevents undue slippage. In neither case is it necessary that the driving ball be moved so close to the center of the disk that these disadvantages arise.

The operation of the high and low speed rollers 19 and 20 may be better understood by the following example: let it be assumed that the radius of the two cylinders is 1", then if the ball 21 is 1" from the center of the disk, the gear ratio between the roller 19 and the disk 11 is 1:1 at that point, and as the roller 19 is assumed to be rotating at 200 R. P. M., the disk 11 will be rotated at 200 R. P. M. Now, with the ball 21 at this point, let it be assumed that the high speed roller 20 takes the control of the disk 11 from the roller 19. Now, if the ball 22 be 3" away from the center of the disk, then the gear ratio between the roller 20 and the disk 11 will be 3:1. As the roller 20 is rotating at 600 R. P. M. then the disk 11 will, as before, be driven at 200 R. P. M.

In other words, the roller 19 may drive the disk 11 from a relatively low speed, at which time its ball 21 will be on the outer end of the roller, to a relatively high speed of say 200 R. P. M. as the ball reaches the assumed position of 1" from the center, and then the ball 22 will move onto the roller 20 and will continue the rotation of the disk at 200 R. P. M., and from thereon will increase the disk speed as it advances radially in toward the center of the disk. Of course, it will be understood that the reverse operation is true: If the roller 20 be operating the disk it will do so until its ball 22 has been rotated to the bearing 39 at which time the ball 21 will have been moved outwardly from its bearing 40 to engage the roller 19 and thereby take over the control of the disk, and continue its speed in an uninterrupted fashion.

The transmission operates in the following way to solve the specific problem referred to above: The time factor $t$ is introduced by the shaft 23 which will be driven at a constant speed; in other words, the low and high speed rollers 19 and 20 are driven at constant speeds proportionate to time. The velocity factor $$R\frac{dB}{dt}$$

is introduced by the shaft 16 so that the position of the driving ball 14 is adjusted radially in accordance with the magnitude of this factor. The position of the cam 32 is adjusted in accordance with the value of range R which is introduced into the transmission by the input shaft 32b. When the factors $t$, $$R\frac{dB}{dt}$$

and R are thus introduced into the mechanism, the disk 11 generates the integral of $$\frac{1}{R}dt$$

The output roller 12 then will generate the integral of $$\frac{R\frac{dB}{dt}dt}{R}$$

which, of course, is the integral of $$\frac{dB}{dt}dt$$

The integral of $$\frac{dB}{dt}$$

with respect to time is the target's bearing B, and this is the output of the shaft 13.

The constant of integration is introduced by means of a suitable differential 44, the input gear 45 of which is driven from the shaft 13. The constant of integration is introduced into the input gear 46 of the differential by means of a shaft 47 which drives the gear 46 through gears 48. The spider 49 of this differential drives an output shaft 50 which is the bearing B, as modified by the constant of integration introduced by the shaft 47.

While I have shown a particular embodiment of my invention, it will be understood, of course, that I do not wish to be limited thereto since many modifications may be made, and I, therefore, contemplate by the appended claims to cover any such modifications as fall within the true spirit and scope of my invention.

What I claim as new and desire to secure by Letters Patent of the United States is:

1. A variable speed transmission comprising a disk, driving means for said disk having a plurality of driving rollers, means for driving said rollers at different speeds, balls constructed and arranged to be placed in contact with said disk and rollers respectively, and means for shifting the positions of said balls in unison so that one only of the balls through its roller is in driving control of said disk at a time.

2. A variable speed transmission comprising a disk, a pair of rollers aligned across a diameter of said disk, means interconnecting said rollers so that one rotates at a speed relatively lower than the other, a pair of balls constructed and arranged to frictionally engage said rollers respectively and said disk, and means simultaneously controlling the radial positions of said balls so that only one at a time can contact its roller and the disk, and further, so that the ball of the high speed roller is moved onto the outer end thereof only when the ball of the low speed roller moves inwardly to the inner end thereof and is about to leave it, and the latter ball is returned to the inner end of the low speed roller only when the high speed ball is moved radially outwardly to the end of said high speed roller and is about to leave it, and means for supporting said balls when they are not in contact with their respective rollers.

3. A variable speed transmission comprising a disk, a pair of rollers aligned across a diameter of said disk, a driving shaft, means connecting said rollers to each other and to said shaft so that one is driven at a speed relatively low with respect to the other and so that the speed ratio between said rollers is fixed, a pair of balls for frictional engagement with said rollers respectively and with said disk, a cam interconnected with said balls for controlling their radial positions simultaneously, the cam operating said balls so that only one at a time can contact its roller and the disk, and further, so that the ball of the high speed roller is moved into engagement with it at its outer end only when the ball of the low speed roller moves inwardly to the inner end of the low speed roller and is about to leave it, and the latter ball is returned to the inner end of the low speed roller only when the high speed ball is moved radially outwardly to the end of said high speed roller and is about to leave it, and rotatably mounted idler bearings at the inner and outer ends of said low and high speed rollers respectively for supporting the respective balls when they are moved from said ends by said cam.

4. A variable speed transmission comprising a driven disk, a pair of driving rollers for said disk, a pair of balls for frictionally engaging said rollers respectively and said disk to effect a driving connection between the respective rollers and the disk, a cam provided with a pair of cam slots, followers in said slots connected to said balls respectively, and said slots shaped so that one only of said balls at a time controls the movement of said disk.

5. A variable speed transmission comprising a driven disk, a pair of driving rollers for said disk, a pair of balls for frictionally engaging said rollers respectively and said disk to effect a driving connection between the respective rollers and the disk, a cam provided with a pair of cam slots, followers in said slots connected to said balls respectively, and said slots shaped so that the ball for one roller is advanced onto it at about the time the other ball is about to leave its rollers and vice versa.

6. A variable speed transmission comprising a disk, a pair of rollers aligned across a diameter of said disk, means interconnecting said rollers so that one rotates at a speed relatively lower than the other, a pair of balls constructed and arranged to frictionally engage said rollers respectively and said disk, a cam plate having therein a pair of cam slots, followers in said slots connected to said balls respectively to control their positions with reference to said rollers, said slots when said cam is turned simultaneously controlling the radial positions of said balls so that only one at a time can contact its roller and the disk, and further, so that the ball of the high speed roller is moved onto the outer end thereof only when the ball of the low speed roller moves inwardly to the inner end of the low speed roller and is about to leave it, and the latter ball is returned to the inner end of the low speed roller only when the high speed ball is moved radially outwardly to the end of said high speed roller and is about to leave it, and means for supporting said balls when they are not in contact with their respective rollers.

7. A variable speed transmission comprising a driven disk, a driving roller positioned in a diameter of said disk opposite one face thereof, a ball in frictional engagement with said roller and said one face effecting a driving connection between said roller and disk, a second roller positioned in a diameter of said disk opposite the opposite face thereof, a second ball in frictional engagement with said opposite face and said second roller, and separate means for adjusting said balls radially with reference to said disk.

EARL E. LIBMAN.